(12) United States Patent
Fujimori

(10) Patent No.: US 7,532,362 B2
(45) Date of Patent: May 12, 2009

(54) IMAGE PROCESSING DEVICE AND DOT DATA GENERATION METHOD

(75) Inventor: Yukimitsu Fujimori, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 640 days.

(21) Appl. No.: 11/177,485

(22) Filed: Jul. 11, 2005

(65) Prior Publication Data

US 2006/0007494 A1   Jan. 12, 2006

(30) Foreign Application Priority Data

Jul. 12, 2004   (JP)   ............... 2004-204155

(51) Int. Cl.
H04N 1/405 (2006.01)
(52) U.S. Cl. .................. 358/3.06; 382/298
(58) Field of Classification Search .......... 358/1.9, 358/2.1, 1.2, 3.06–3.09, 3.12, 528, 451; 382/298–299
See application file for complete search history.

(56) References Cited

U.S. PATENT DOCUMENTS 6,471,332 B1 * 10/2002 Vilanova et al. ............ 347/43
6,836,344 B2   12/2004 Koide et al.

FOREIGN PATENT DOCUMENTS

| JP | 8-132724 A | 5/1996 |
|---|---|---|
| JP | 09-219794 | 8/1997 |
| JP | 11-208031 | 8/1999 |
| JP | 11-240202 A | 9/1999 |
| JP | 2000-004368 A | 1/2000 |
| JP | 2001126059 A * | 5/2001 |
| JP | 2001-293905 | 10/2001 |
| JP | 2002-160353 A | 6/2002 |
| JP | 2003-237115 | 8/2003 |

* cited by examiner

*Primary Examiner*—Thomas D Lee
*Assistant Examiner*—Stephen M Brinich
(74) *Attorney, Agent, or Firm*—Sughrue Mion, PLLC

(57) ABSTRACT

The image processing device of the invention generates dot data representing dot on-off state in respective pixels of an image and supplies the generated dot data to a printing device. The printing device creates multiple dots on a printing medium to print an image and is designed to print the image with at least a first ratio of a printing resolution in a main scanning direction to a printing resolution in a sub-scanning direction. The image processing device includes a halftoning module that applies one specified setting of a halftoning parameter, which corresponds to the first ratio, to a halftoning process to generate dot data from image data representing the image. When the image printed with the first ratio by the printing device according to the dot data generated with the specified setting of the halftoning parameter corresponding to the first ratio has an uneven printing result, the halftoning module applies another specified setting of the halftoning parameter, which corresponds to a second ratio different from the first ratio, to the halftoning process to generate another dot data from the image data. This arrangement desirably eliminates the potential for uneven printing due to a positional misalignment of dots without any significant cost increase.

6 Claims, 12 Drawing Sheets

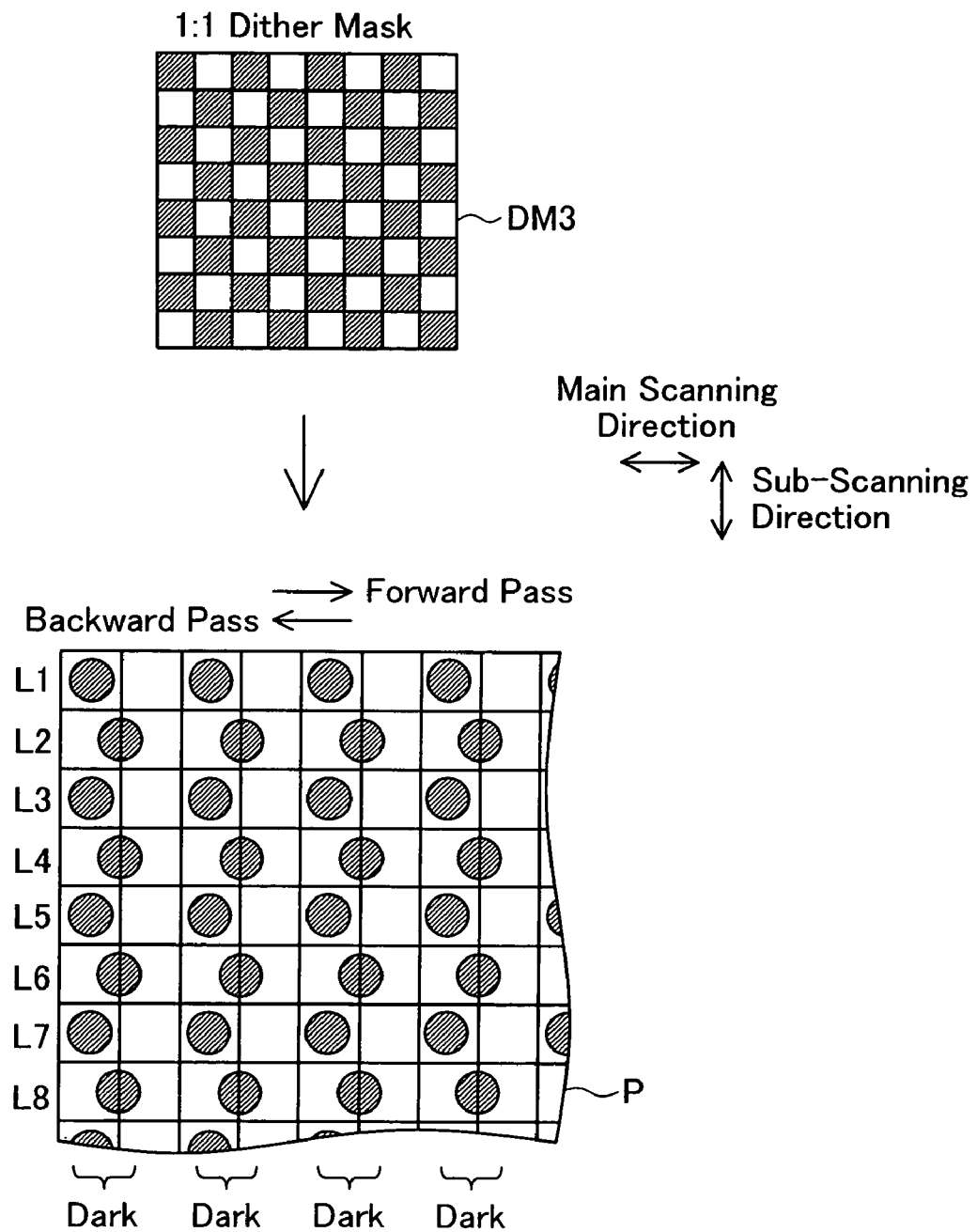

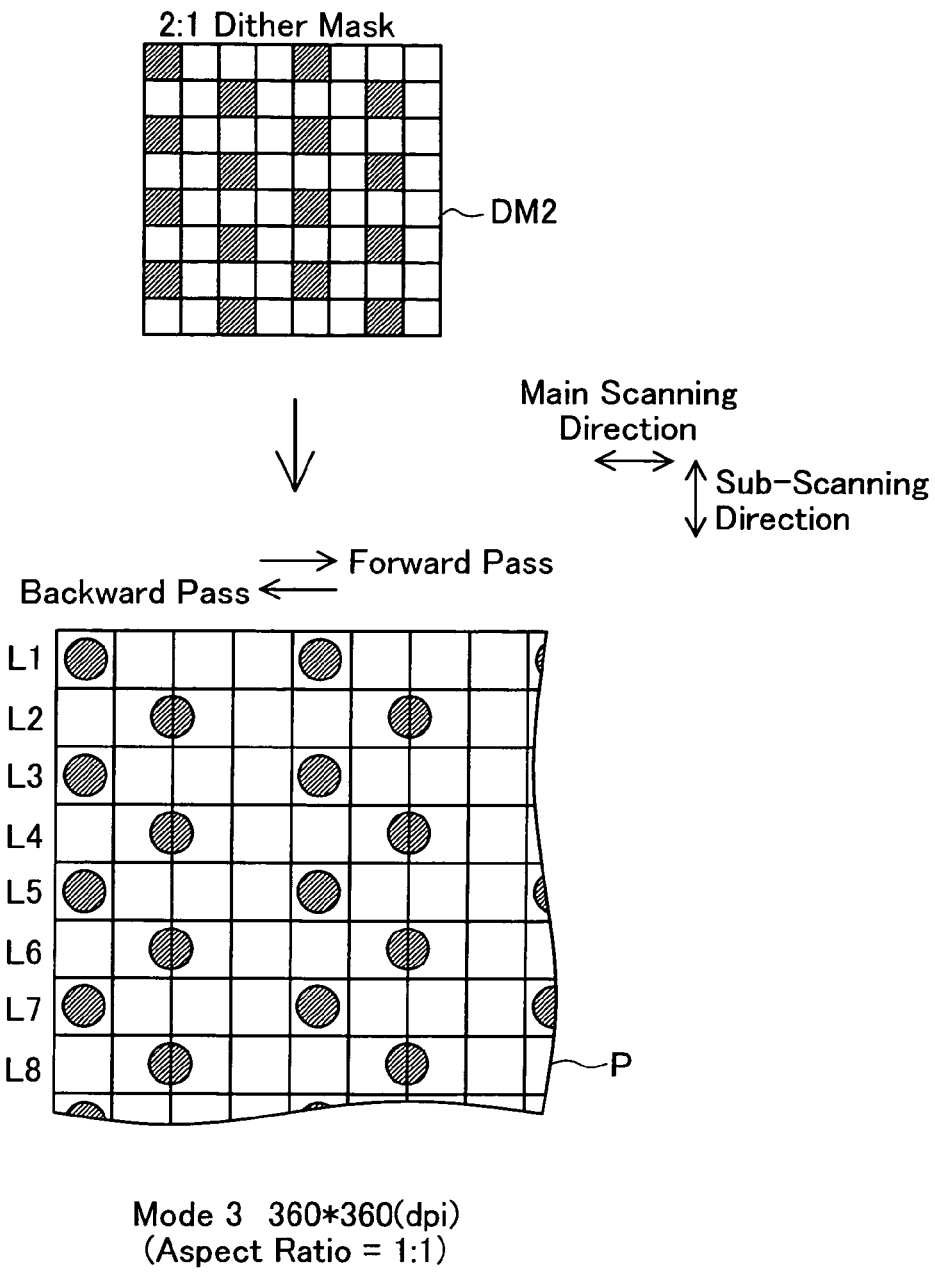

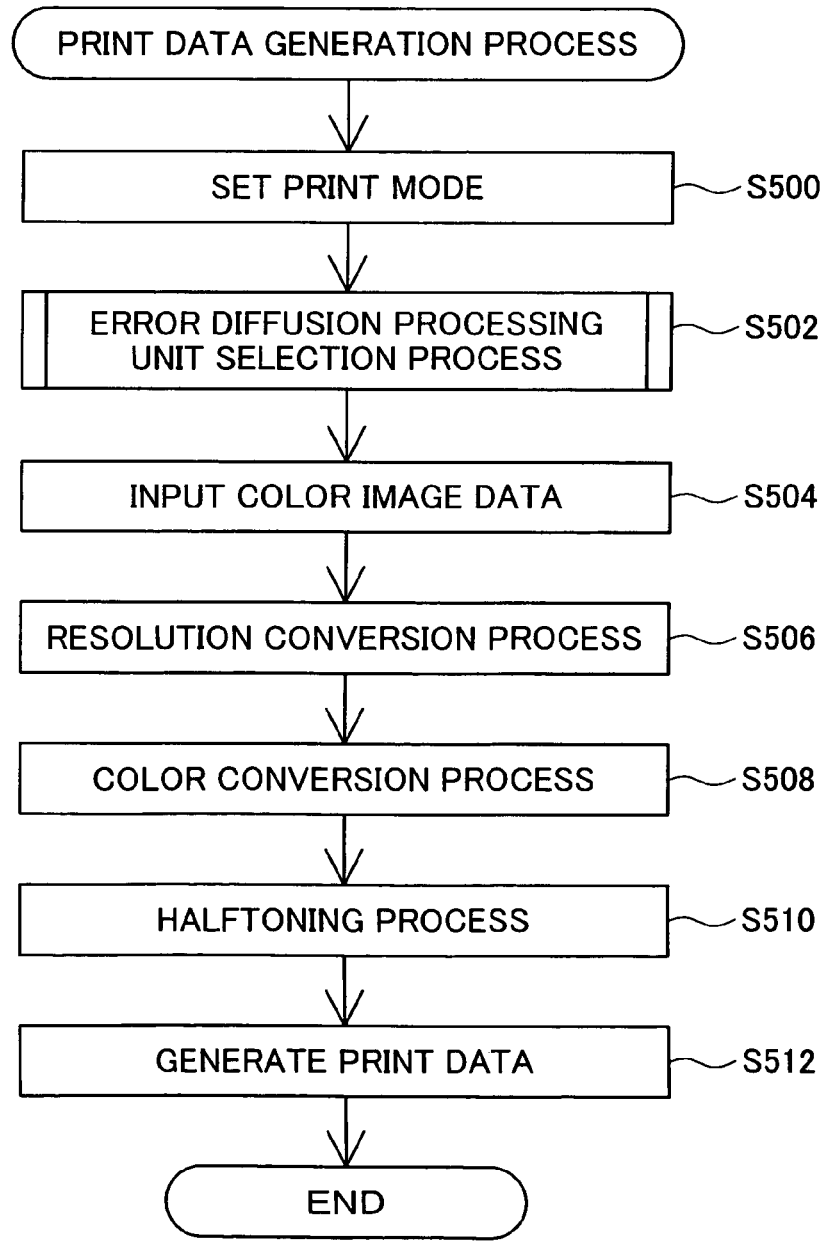

IMAGE PROCESSING DEVICE AND DOT DATA GENERATION METHOD

BACKGROUND OF THE INVENTION

1. Field of the Invention

The present invention relates to a technique of effectively eliminating the potential for uneven printing caused by a positional misalignment of dots without any significant cost increase, in a printing device that creates dots on a printing medium to complete a printed image.

2. Description of the Related Art

Conventional printing devices in widespread use eject ink droplets from print heads and create dots on printing media to complete printed images.

One example of such printing devices is disclosed in Japanese Patent Laid-Open Gazette No. 8-132724.

In such printing devices, the manufacturing error of each print head may make the positions of dots actually created on a printing medium deviate from their expected positions and cause an uneven printing result. The uneven printing problem due to this positional misalignment of dots is described with reference to FIGS. 7 through 9. The following description regards an inkjet printer (hereafter simply referred to as the 'printer') as an example of such printing devices having the uneven printing problem.

FIG. 7 shows a typical arrangement of nozzle holes on a print head.

The print head has four nozzle arrays for respectively ejecting four color inks, black (K), cyan (C), magenta (M), and yellow (Y). Each nozzle array includes multiple nozzles arranged in two lines in a sub-scanning direction (not shown). Each nozzle in the nozzle array has one nozzle hole. The nozzle holes are thus grouped by the color and are arranged in the two lines in the sub-scanning direction as shown in FIG. 7. Each one-dot chain line represents a connecting line of the designed center positions of the aligned nozzle holes in each nozzle array.

In this illustrated example of FIG. 7, the manufacturing error of the print head makes the actual center positions of nozzle holes on a right line in the black (K) nozzle array deviate from the designed center positions. In the description below, the right line of nozzle holes having a deviation of the center positions is simply called the 'nozzle holes H2' and the left line of nozzle holes having no deviation of the center positions is simply called the 'nozzle holes H1'.

FIGS. 8(A) and 8(B) show ink droplets ejected from the nozzle holes H1 and H2 of FIG. 7 to reach printing paper P.

FIG. 8(A) shows black (K) ink droplets ejected from the nozzle holes H1 to reach the printing paper P. FIG. 8(B) shows black (K) ink droplets ejected from the nozzle holes H2 to reach the printing paper P. The nozzle holes H1 and H2 of FIG. 8 are identical with the nozzle holes H1 and H2 explained above with reference to FIG. 7.

A print head of FIG. 8 mounted on the printer has main scans to move forward and backward in a main scanning direction and ejects ink droplets in both forward passes and backward passes. As shown in FIG. 8, black (K) ink droplets are ejected from the nozzle holes H1 in a forward pass and from the nozzle holes H2 in a backward pass.

The nozzle holes H1 have no positional deviation due to the manufacturing error and accordingly cause ejected ink droplets to reach their expected impact positions as shown in FIG. 8(A). The nozzle holes H2, on the other hand, have a positional deviation due to the manufacturing error and accordingly cause ejected ink droplets to reach positions deviated in the moving direction of the print head from their expected impact positions as shown in FIG. 8(B).

FIGS. 9(A) and 9(B) show resulting arrangements of dots created on the printing paper P of FIG. 8.

FIG. 9(A) shows an arrangement of dots created on the printing paper P on the assumption of no positional deviation of the nozzle holes H2. FIG. 9(B) shows an arrangement of dots created on the printing paper P on the assumption of a positional deviation of the nozzle holes H2 as shown in FIG. 7.

L1 to L8 of FIG. 9 represent raster lines (main scan lines). Dots on odd-numbered raster lines L1, L3, L5, and L7 are created in a forward pass of a main scan, whereas dots on even-numbered raster lines L2, L4, L6, and L8 are created in a backward pass of the main scan. The printer makes each sub-scan at a timing of changing the direction of main scan from the forward pass to the backward pass or at a timing of changing the direction of main scan from the backward pass to the forward pass. The sub-scan feeds the printing paper P in the sub-scanning direction that is perpendicular to the main scanning direction.

In the case of no positional deviation of the nozzle holes H2, dots are evenly scattered on the printing paper P to give an even printing result as shown in FIG. 9(A).

In the case of a positional deviation of the nozzle holes H2, on the other hand, ejection of ink droplets to form the dot pattern of FIG. 9(A) causes a leftward shift of the positions of dots on the even-numbered raster lines. The positional misalignment makes clear distinction between relatively dense dot areas and relatively sparse dot areas in the main scanning direction as shown in FIG. 9(B). This gives an uneven printing result including dark areas of relatively high dot densities and light areas of relatively low dot densities.

The cause of the uneven printing problem is not restricted to the manufacturing error of the print head, but the uneven printing problem is also ascribed to the attachment error of the print head and cockling of printing media due to ink absorption.

The printing device (printer) disclosed in the above cited reference of Japanese Patent Laid-Open Gazette No. 8-132724 is configured to prevent cockling of printing media as one main cause of the uneven printing problem. This configuration, however, requires a heat treatment device in addition to the general printer structure and thus significantly increases the total manufacturing cost of the printer.

SUMMARY OF THE INVENTION

The object of the invention is thus to provide a technique of eliminating the potential for uneven printing due to a positional misalignment of dots without any significant cost increase.

In order to attain at least part of the above and the other related objects, the present invention is directed to a first image processing device that generates dot data representing dot on-off state in respective pixels of an image and supplies the generated dot data to a printing device. The printing device creates multiple dots on a printing medium to print an image and is designed to print the image with at least a first ratio of a printing resolution in a main scanning direction to a printing resolution in a sub-scanning direction. The first image processing device includes a halftoning module that applies one specified setting of a halftoning parameter, which corresponds to the first ratio, to a halftoning process to generate dot data from image data representing the image. When the image printed with the first ratio by the printing device according to the dot data generated with the specified setting of the halftoning parameter corresponding to the first ratio has an uneven printing result, the halftoning module applies another specified setting of the halftoning parameter, which corresponds to a second ratio different from the first ratio, to the halftoning process to generate another dot data from the image data.

When there is a potential for uneven printing, the first image processing device of the invention applies another setting of the halftoning parameter, which is specified corresponding to the second ratio different from the first ratio, to the halftoning process. The resulting dot data accordingly specifies a different interval of dot-on pixels from an interval of dot-on pixels specified by the dot data generated with the setting of the halftoning parameter specified corresponding to the first ratio.

In some cases, when an image is printed with the first ratio according to the dot data generated with the setting of the halftoning parameter specified corresponding to the first ratio, a positional misalignment of dots may arise to give the narrower or wider dot interval than the appropriate dot interval and cause an uneven printing result. The first image processing device of the invention generates the different dot data with another setting of the halftoning parameter specified corresponding to the second ratio. This arrangement widens or narrows the dot interval of a resulting image printed by the printing device, thus eliminating the potential for uneven printing.

The printing device prints the image with the first ratio according to the generated dot data and has the required structure that is substantially similar to the structure of the conventional printing device. This arrangement thus desirably prevents a significant increase in manufacturing cost of the printing device. The first image processing device of the invention performs the halftoning process with the setting of the halftoning parameter specified corresponding to the ratio of the printing resolution in the main scanning direction to the printing resolution in the sub-scanning direction, and has the required structure that is relatively similar to the structure of the conventional image processing device. This arrangement thus desirably prevents a significant increase in manufacturing cost of the image processing device.

In one preferable embodiment of the first image processing device of the invention, the halftoning parameter is either a dither mask in systematic dither method or a threshold matrix in density pattern method.

Different values are set to the halftoning parameter corresponding to the ratio of the printing resolution in the main scanning direction to the printing resolution in the sub-scanning direction. The halftoning process with the different settings of the halftoning parameter gives different dot data that specify different intervals of dot-on pixels in either the main scanning direction or the sub-scanning direction.

The present invention is also directed to a second image processing device that generates dot data representing dot on-off state in respective pixels of an image and supplies the generated dot data to a printing device. The printing device creates multiple dots on a printing medium to print an image and is designed to print the image with at least a first ratio of a printing resolution in a main scanning direction to a printing resolution in a sub-scanning direction. The second image processing device has multiple different halftoning process modules, which include at least a first halftoning process module corresponding to the first ratio and a second halftoning process module corresponding to a second ratio different from the first ratio. The second image processing device activates the first halftoning process module corresponding to the first ratio to perform a halftoning process and generate dot data from image data representing the image. When the image printed with the first ratio by the printing device according to the dot data generated by the first halftoning process module has an uneven printing result, the second image processing device activates the second halftoning process module corresponding to the second ratio to perform the halftoning process and generate another dot data from the image data.

When there is a potential for uneven printing, the second image processing device of the invention uses the second halftoning process module, which corresponds to the second ratio and is different from the first halftoning process module corresponding to the first ratio, for the halftoning process. The resulting dot data accordingly specifies a different interval of dot-on pixels from an interval of dot-on pixels specified by the dot data generated by the first halftoning process module.

In some cases, when an image is printed with the first ratio according to the dot data generated by the first halftoning process module, a positional misalignment of dots may arise to give the narrower or wider dot interval than the appropriate dot interval and cause an uneven printing result. The second image processing device of the invention uses the second halftoning process module for the halftoning process. This arrangement widens or narrows the dot interval of a resulting image printed by the printing device, thus eliminating the potential for uneven printing.

The printing device prints the image with the first ratio according to the generated dot data and has the required structure that is substantially similar to the structure of the conventional printing device. This arrangement thus desirably prevents a significant increase in manufacturing cost of the printing device.

In one preferable embodiment of the second image processing device of the invention, each of the multiple different halftoning process modules includes an error diffusion processing unit that performs the halftoning process by error diffusion method.

The image processing device of the invention accordingly has a relatively similar structure to the structure of the conventional image processing device that adopts the known error diffusion method to the halftoning process. This arrangement desirably prevents a significant increase in manufacturing cost of the image processing device.

The technique of the invention is not restricted to the image processing devices discussed above, but is also actualized by corresponding dot data generation methods, computer programs to attain the functions of the image processing devices and the corresponding dot data generation methods, recording media in which such computer programs are recorded, data signals that include such computer programs and are embodied in carrier waves, and diversity of other adequate applications.

In each of the applications of the computer programs and the recording media in which the computer programs are recorded, the computer program may be constructed as a whole program for controlling the operations of the image processing device or as program codes for exerting only the essential functions of the invention. Typical examples of the recording media include flexible disks, CD-ROMs, DVD-ROMs, magneto-optical disks, IC cards, ROM cartridges, punched cards, prints with barcodes and other codes printed thereon, internal storage devices (memories, such as RAMs and ROMs) and external storage devices of the computer, and diversity of other computer readable media.

BRIEF DESCRIPTION OF THE DRAWINGS

FIG. 2 shows an arrangement of dots created on printing paper P in Mode 3 with application of a 1:1 dither mask DM3 to the halftoning process;

FIG. 3 shows an arrangement of dots created on printing paper P in Mode 3 with application of a 2:1 dither mask DM2 to the halftoning process;

FIG. 4 shows the data structure of mask specification data md stored in a mask specification data storage unit of a printer in the printing system of FIG. 1;

FIG. 11 shows the data structure of processing unit specification data sd stored in a processing unit specification data storage unit of a printer in the printing system of FIG. 10;

FIG. 12 is a flowchart showing a print data generation process in the second embodiment;

DESCRIPTION OF THE PREFERRED EMBODIMENTS

Some modes of carrying out the invention are described below in the following sequence as preferred embodiments:

A. First Embodiment

Figure 1:
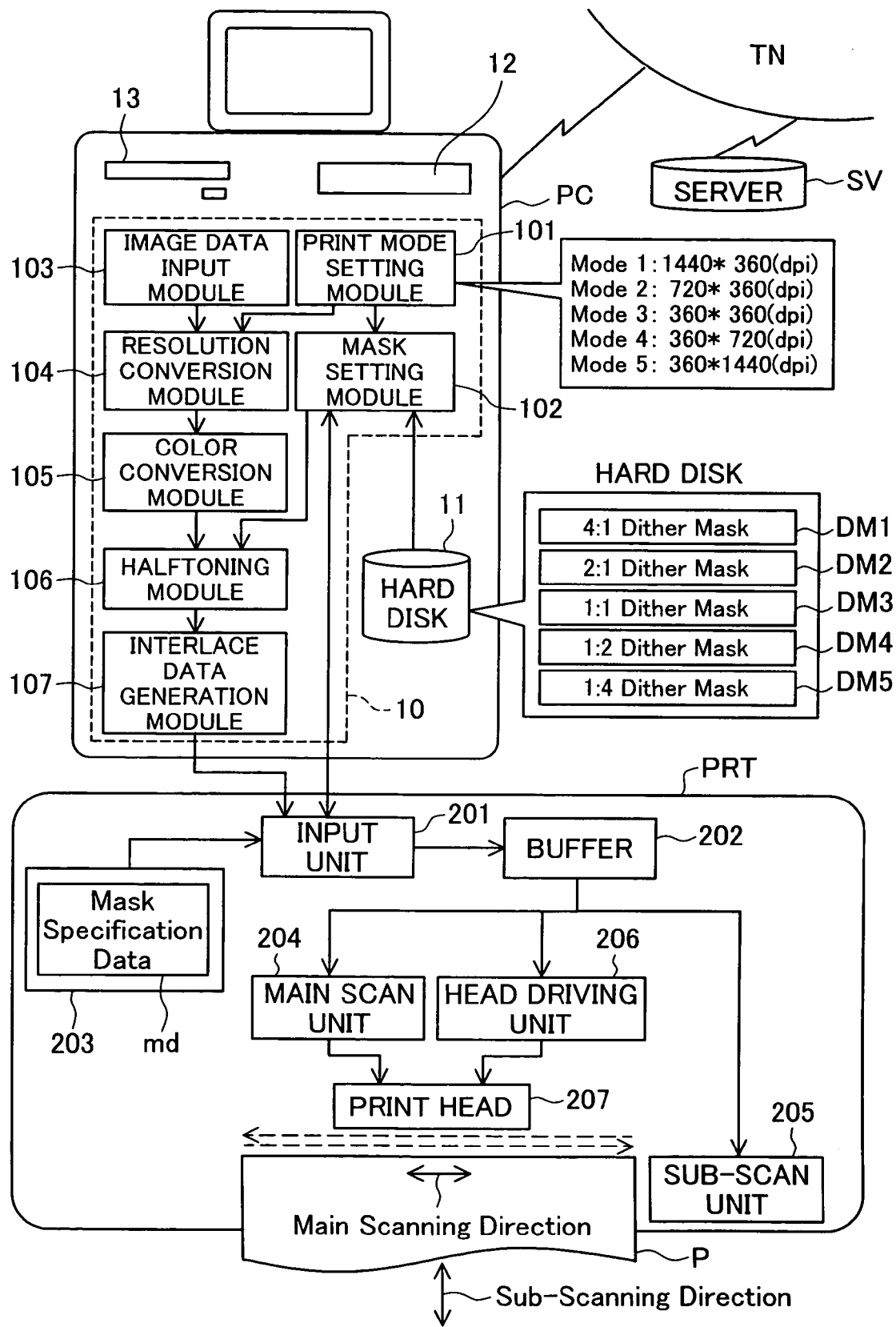
FIG. 1 schematically illustrates the configuration of a printing system in a first embodiment of the invention.

A-1. System Configuration
A-2. Prevention of Uneven Printing
A-3. Print Data Generation Process
A-4. Effects of Embodiment B. Second Embodiment B-1. System Configuration
B-2. Prevention of Uneven Printing
B-3. Print Data Generation Process
B-4. Effects of Embodiment C. Modifications A. First Embodiment A-1. System Configuration FIG. 1 schematically illustrates the configuration of a printing system in a first embodiment of the invention. In the printing system of FIG. 1, a printer PRT is connected to a computer PC and receives print data generated by a printer driver 10 installed in the computer PC to perform a printing operation. The print data includes raster data representing the dot on-off state of respective pixels on rasters and sub-scan feed data representing a feed amount of printing paper in each sub-scan. The computer PC and the raster data of this embodiment are respectively equivalent to the image processing device and the dot data of the invention.

The computer PC includes a hard disk 11, a CD-ROM drive 12, a flexible disk drive 13, as well as a CPU, memories, and an interface card (not shown).

The computer PC is connected to an external network TN via the non-illustrated interface card and may have access to a selected server SV to download a required program for driving and controlling the printer PRT as well as required data. The computer PC may otherwise load the required program and data from a recording medium, such as a CD-ROM set in the CD-ROM drive 12 or a flexible disk set in the flexible disk drive 13. The whole program required for printing may be loaded as an integral body or only the required functions may be loaded in the form of modules.

A selected application program runs under control of a specific operating system in the computer PC to generate and retouch images. The printer driver 10 is incorporated in the operating system. The printer driver 10 is a program that attains the function of generating print data, which includes the sub-scan feed data and the raster data.

The printer driver 10 includes a print mode setting module 101, a mask setting module 102, an image data input module 103, a resolution conversion module 104, a color conversion module 105, a halftoning module 106, and an interlace data generation module 107. The printer driver 10 receives image data from the application program and generates print data to be supplied to the printer PRT.

The print mode setting module 101 provides a GUI (graphical user interface) for the user's selection of a desired print mode and sets a selected print mode in response to the user's operation of an input device (not shown), such as a keyboard and a mouse. In the structure of this embodiment, the print mode setting module 101 has five available print mode options:

(1) Mode 1: 1440(dpi)×360(dpi)
(2) Mode 2: 720(dpi)×360(dpi)
(3) Mode 3: 360(dpi)×360(dpi)
(4) Mode 4: 360(dpi)×720(dpi)
(5) Mode 5: 360(dpi)×1440(dpi)

Each print mode is expressed by (printing resolution in a main scanning direction)×(printing resolution in a sub-scanning direction). For example, 'Mode 1' is expressed by the product of the printing resolution of 1440 (dpi) in the main scanning direction and the printing resolution of 360 (dpi) in the sub-scanning direction.

The mask setting module 102 sets a dither mask (dither matrix), which is to be applied to a halftoning process, based on mask specification data md (discussed later) and the print mode set by the print mode setting module 101. In the structure of this embodiment, the hard disk 11 stores five different dither masks:

(1) 4:1 dither mask DM1
(2) 2:1 dither mask DM2
(3) 1:1 dither mask DM3
(4) 1:2 dither mask DM4
(5) 1:4 dither mask DM5

The ratio in each of the dither masks DM1 to DM5 represents the aspect ratio of the printing resolution in the main scanning direction to the printing resolution in the sub-scanning direction. These dither masks DM1 to DM5 are generally available and are not specifically provided for the printer PRT.

The image data input module 103 inputs color image data, which consists of RGB (red, green, blue) tone values of respective pixels, from the application program.

The resolution conversion module 104 converts the resolution of the input color image data generated by the application program into a printing resolution processible by the printer driver 10 corresponding to the print mode set by the print mode setting module 101.

The color conversion module 105 refers to a color conversion table (not shown) stored in the hard disk 11 and converts the color tone data of the respective pixels constituting the input color image data into tone data representing tone values (0 to 255) of respective color inks, black (K), cyan (C), magenta (M), and yellow (Y) set in the printer PRT.

The halftoning module 106 performs the halftoning process with a selected dither mask set by the mask setting module 102 by the known systematic dither method to convert the tone values of the respective pixels expressed by the tone data into raster data representing the dot on-off state of the respective pixels.

The interlace data generation module 107 rearranges the raster data generated by the halftoning module 106 and sub-scan feed data in a preset format for transfer to the printer PRT and thereby generates print data, which is supplied to the printer PRT.

The printer PRT mainly includes an input unit 201, a buffer 202, a mask specification data storage unit 203, a main scan unit 204, a sub-scan unit 205, a head driving unit 206, and a print head 207.

The input unit 201 receives print data transferred from the printer driver 10 and temporarily stores the received print data into the buffer 202. The main scan unit 204 and the sub-scan unit 205 respectively control main scans of the print head 207 and sub-scan feeds of printing paper P, based on the print data stored in the buffer 202. The head driving unit 206 actuates the print head 207 to eject ink droplets and create dots on the printing paper P, thus completing a printed image.

The mask specification data storage unit 203 is a memory device to store the mask specification data md described later.

The print head 207 has the same structure including the nozzle arrays as the conventional print head described above as the prior art with reference to FIG. 7. The print head 207 of this embodiment is thus assumed to have the nozzle holes H2 on the right line of the black (K) nozzle array deviated from their design positions due to the manufacturing error.

Like the conventional printer described above as the prior art, this printer PRT ejects ink droplets in both forward passes and backward passes of main scans. The forward passes of the main scans create dots on odd-numbered raster lines, while the backward passes of the main scans create dots on even-numbered raster lines. Each sub-scan is made at a timing of changing the direction of main scan from the forward pass to the backward pass or at a timing of changing the direction of main scan from the backward pass to the forward pass.

A-2. Prevention of Uneven Printing

As described above, the printer PRT performs main scans and sub-scans in the same manner as the conventional printer described above as the prior art. A printing operation of the printer PRT according to print data may thus cause an uneven printing result as shown in FIG. 9(B).

Figure 9A:
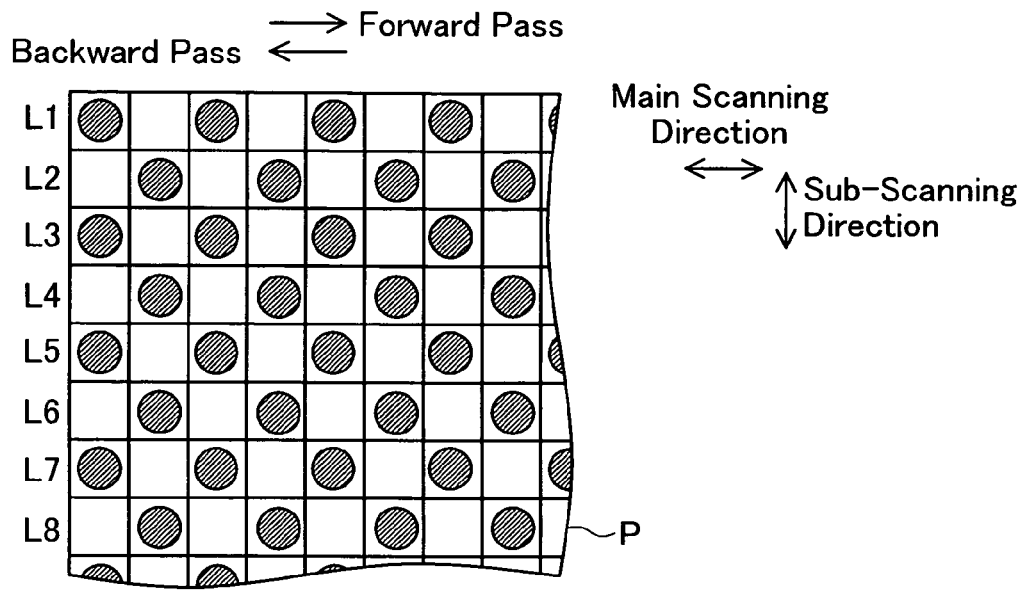
FIGS. 9(A) and 9(B) show resulting arrangements of dots created on the printing paper P of FIG. 8.
Figure 9B:
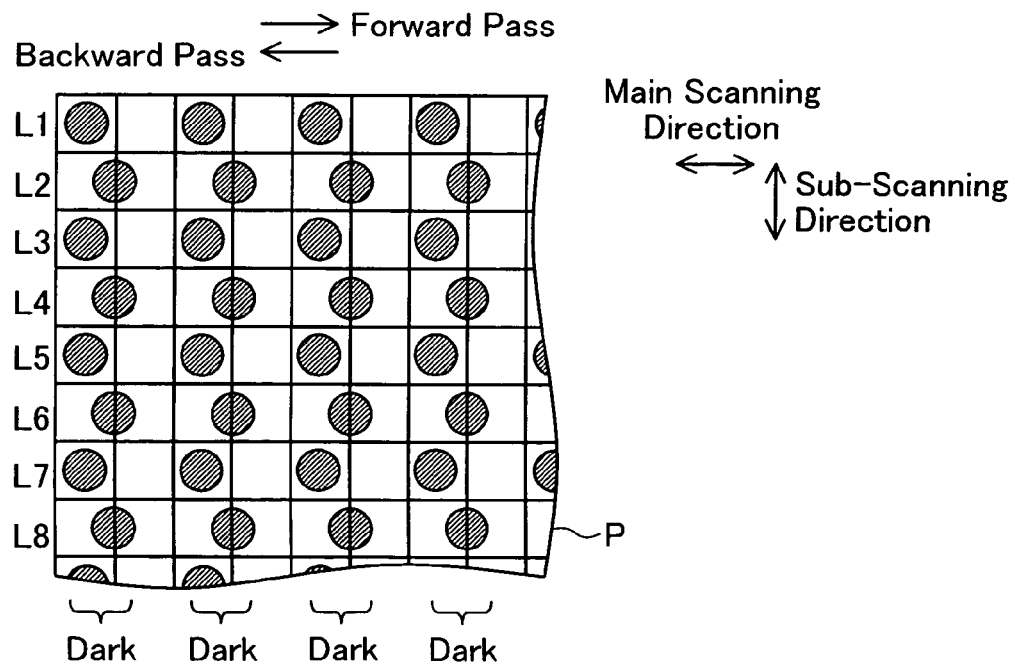

The uneven printing problem of FIG. 9(B) is eliminated by widening the interval between dots in the main scanning direction. The halftoning process of this embodiment accordingly applies a different dither mask from an originally selected dither mask to generate modified raster data having dot-on pixels arranged at wider intervals in the main scanning direction. A printing operation according to print data including the modified raster data widens the interval between dots in the main scanning direction and thereby eliminates the potential for uneven printing.

The technique of this embodiment to prevent uneven printing is described in detail with reference to FIGS. 2 and 3.

FIG. 2 shows an arrangement of dots created on printing paper P in Mode 3 with application of the 1:1 dither mask DM3 to the halftoning process. The upper drawing of FIG. 2 shows the 1:1 dither mask DM3 and the lower drawing shows an arrangement of dots created on the printing paper P.

The raster lines L1 to L8 of FIG. 2 are identical with the raster lines L1 to L8 of FIG. 9.

The dither mask is a matrix of 64 (=8×8) cells. One of numerical values in a range of 0 to 255 is set in each cell.

For the clarity of explanation, the cells with numerical values of less than 128 are hatched.

When the number of pixels per unit length in the main scanning direction is identical with the number of pixels per unit length in the sub-scanning direction as in the example of 360 (dpi)×360 (dpi), the interval between dot-on pixels (for example, dot creation in every other pixel) in the main scanning direction is equal to the interval between dot-on pixels (for example, dot creation in every other pixel) in the sub-scanning direction. These equal intervals between dot-on pixels result in an even arrangement of dots in the main scanning direction and in the sub-scanning direction. The 1:1 dither mask DM3 has the settings of numerical values in the respective cells of the matrix to attain this dot arrangement.

Namely the cell intervals with the settings of the numerical values of less than 128 are identical in the main scanning direction and in the sub-scanning direction in the 1:1 dither mask DM3 as shown in the upper drawing of FIG. 2.

The tone data having a fixed tone value of '128' in all pixels goes through the halftoning process with the 1:1 dither mask DM3. The hatched cells in the 1:1 dither mask DM3 have the settings of the numerical values of less than 128. Raster data thus generated specify pixels mapped to these hatched cells as dot-on pixels.

A printed image according to print data including this raster data in Mode 3 with a 1 to 1 aspect ratio (360 (dpi)×360 (dpi)) has an uneven printing result as shown in the lower drawing of FIG. 2, which is equivalent to FIG. 9(B).

FIG. 3 shows an arrangement of dots created on printing paper P in Mode 3 with application of the 2:1 dither mask DM2 to the halftoning process. The upper drawing of FIG. 3 shows the 2:1 dither mask DM2 and the lower drawing shows an arrangement of dots created on the printing paper P.

The raster lines L1 to L8 of FIG. 3 are identical with the raster lines L1 to L8 of FIG. 9.

When the number of pixels per unit length in the main scanning direction is greater than the number of pixels per unit length in the sub-scanning direction as in the example of 720 (dpi)×360 (dpi), the interval between dot-on pixels (for example, dot creation in every fourth pixel) in the main scanning direction is wider than the interval between dot-on pixels (for example, dot creation in every other pixel) in the sub-scanning direction. This interval difference between dot-on pixels results in an even arrangement of dots in the main scanning direction and in the sub-scanning direction. The 2:1 dither mask DM2 has the settings of numerical values in the respective cells of the matrix to attain this dot arrangement.

Namely the cell interval with the settings of the numerical values of less than 128 in the main scanning direction is wider than that in the sub-scanning direction in the 2:1 dither mask DM2 as shown in the upper drawing of FIG. 3.

The tone data having a fixed tone value of '128' in all pixels goes through the halftoning process with the 2:1 dither mask DM2. Raster data thus generated specify pixels mapped to these hatched cells as dot-on pixels.

A printed image according to print data including this raster data in Mode 3 with the 1 to 1 aspect ratio (360 (dpi)× 360 (dpi)) has a leftward shift of the positions of dots on the even raster lines, due to the positional deviation of the nozzle holes H2. The application of the 2:1 dither mask DM2 to the halftoning process widens the dot interval in the main scanning direction than the dot interval in the dot arrangement of FIG. 2 and gives the farther distance between the adjoining dots in relatively dense dot areas of FIG. 2. This desirably prevents the occurrence of uneven printing as shown in the lower drawing of FIG. 3.

As described above, application of the 2:1 dither mask DM2 to the halftoning process effectively prevents the occurrence of the uneven printing result in Mode 3 shown in FIG. 2.

A-3. Print Data Generation Process

The mask specification data md is stored in the mask specification data storage unit 203 of the printer PRT shown in FIG. 1, prior to shipment of the printer PRT.

FIG. 4 shows the data structure of the mask specification data md stored in the mask specification data storage unit 203. The mask specification data md includes information on a print mode having a potential for uneven printing and information on a selected dither mask to be applied for elimination of the potential for uneven printing in the print mode. In the illustrated example, since application of the 2:1 dither mask DM2 prevents the occurrence of uneven printing in Mode 3 as described above, the mask specification data md has registered information of 'Mode 3' and '2:1 dither mask' as shown in FIG. 4.

The following procedure may be adopted to specify the information on the 'print mode having a potential for uneven printing' and the 'selected dither mask to be applied for elimination of the potential for uneven printing in the print mode' registered in the mask specification data md. In an inspection process before shipment of the printer PRT, the inspector prints test images in each print mode with all the available dither masks for the halftoning process, that is, the 4:1 dither mask DM1, the 2:1 dither mask DM2, the 1:1 dither mask DM3, the 1:2 dither mask DM4, and the 1:4 dither mask DM5. Based on the results of these test printing, the inspector specifies the print mode having a potential for uneven printing and the selected dither mask to be applied for elimination of the potential for uneven printing in the print mode.

The mask data md having the registered information on the 'print mode having a potential for uneven printing' and the 'selected dither mask to be applied for elimination of the potential for uneven printing in the print mode' is stored in the mask specification data storage unit 203, before shipment of the printer PRT.

A process of generating print data including raster data configured to prevent the occurrence of uneven printing is described with reference to the flowcharts of FIGS. 5 and 6.

Figure 5:
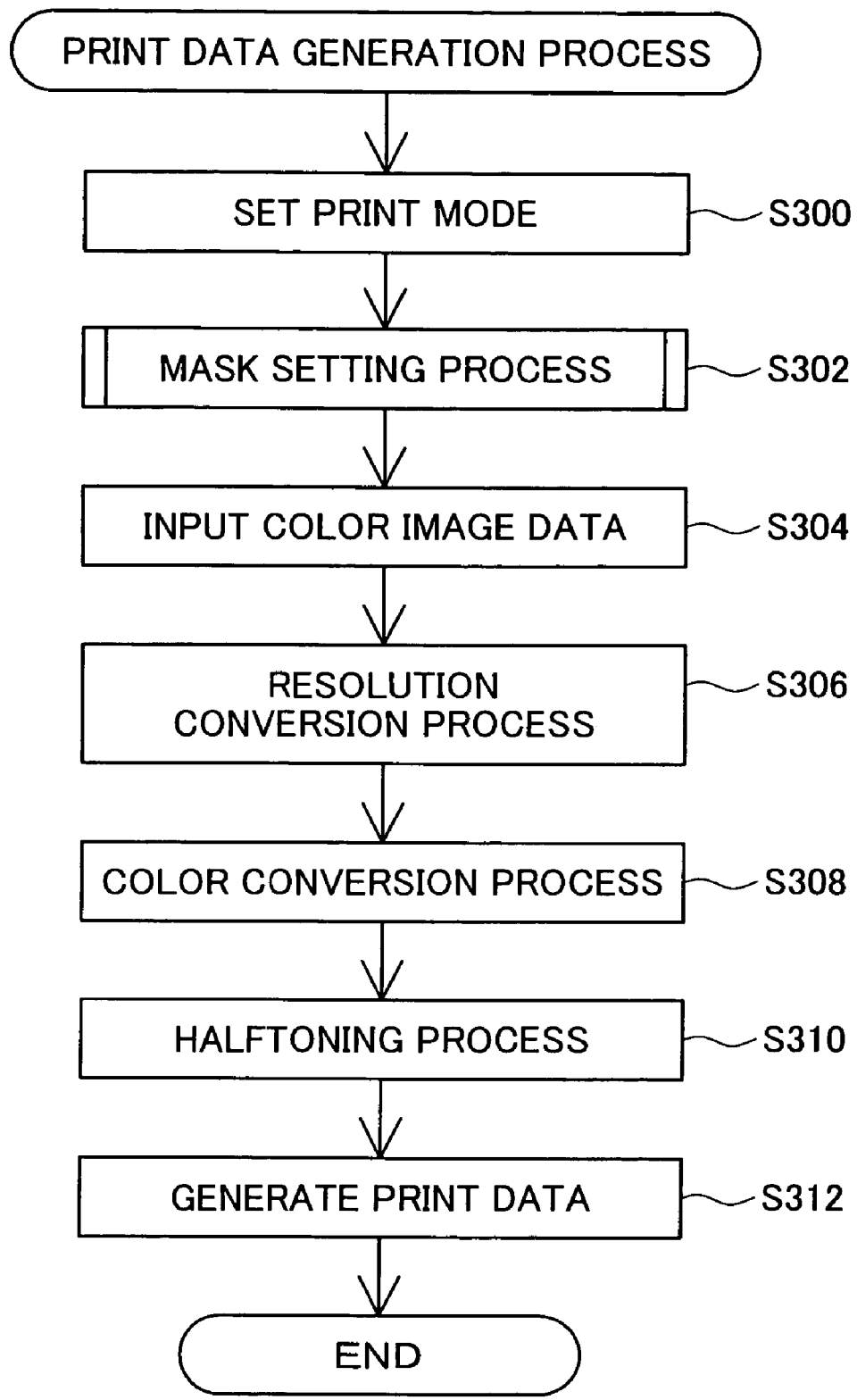
FIG. 5 is a flowchart showing a print data generation process in the first embodiment.

FIG. 5 is a flowchart showing a print data generation process in the first embodiment.

In the illustrated example, the user selects 'Mode 3 (360 (dpi)×360 (dpi))' among the five print mode options through the GUI provided by the print mode setting module 101 and sends a print command to the printer driver 10 to print an object image generated by and input from the application program with the printer PRT.

In the print data generation process, the print mode setting module 101 first sets the user's selected print mode, which is stored as print mode information in a non-illustrated internal memory (step S300). The mask setting module 102 then executes a mask setting process (step S302). The details of this mask setting process are described with reference to the flowchart of FIG. 6.

Figure 6:
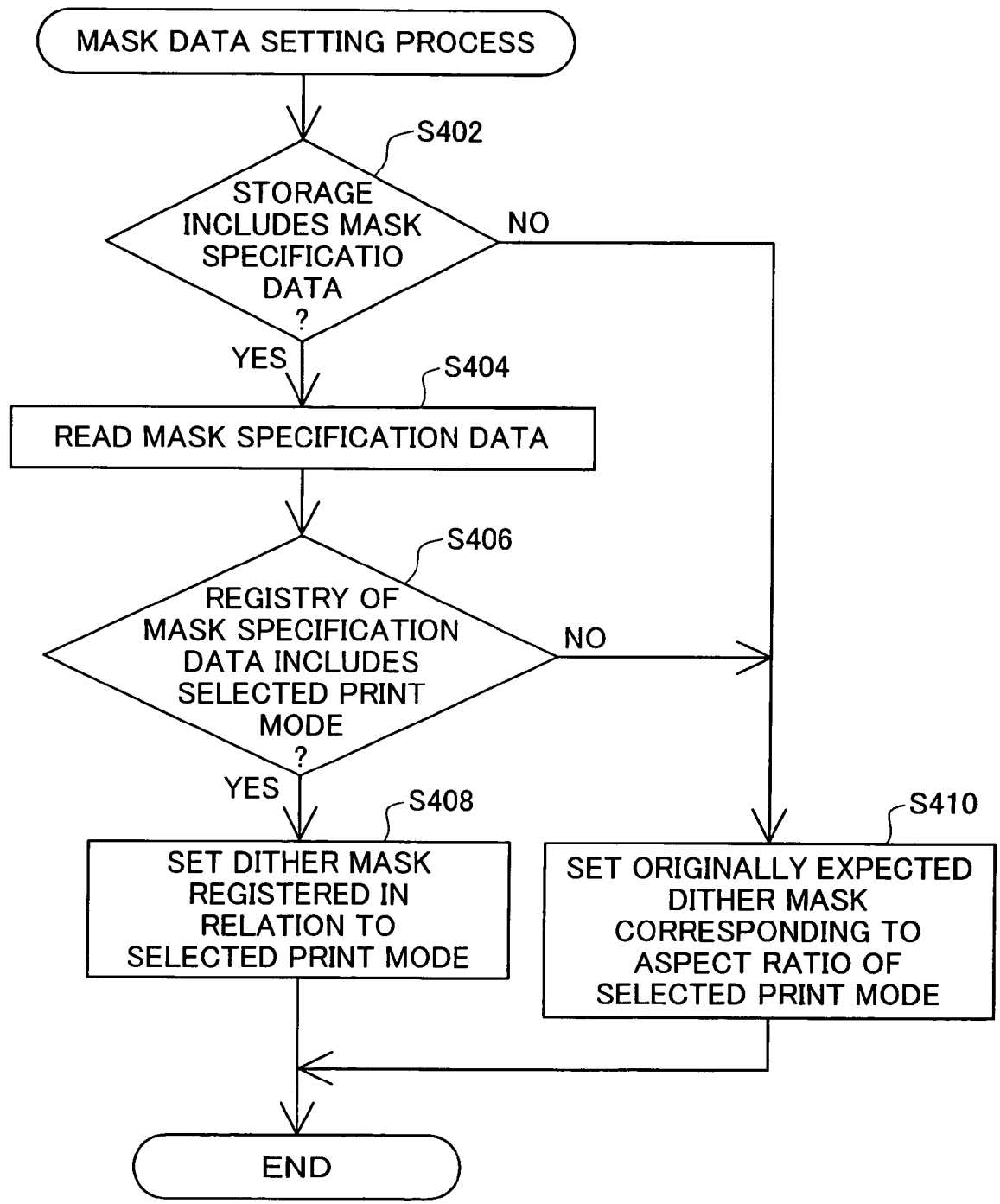
FIG. 6 is a flowchart showing the details of a mask setting process in the print data generation process of FIG. 5.

FIG. 6 is a flowchart showing the details of the mask setting process at step S302 executed by the mask setting module 102.

The mask setting module 102 determines whether the mask specification data storage unit 203 of the printer PRT has storage of the mask specification data md (step S402) and, in response to an affirmative answer, reads the mask specification data md from the mask specification data storage unit 203 (step S404).

The mask setting module 102 reads out the print mode information representing the user's selected print mode set by the print mode setting module 101 and determines whether the selected print mode is included in the registry of the mask specification data md (step S406). When the selected print mode is included in the registry, the mask setting module 102 reads a dither mask registered in relation to the selected print mode from the hard disk 11 and sets the registered dither mask in the internal memory to be applied to the halftoning process in the selected print mode (step S408).

In one example, the mask specification data storage unit 203 has storage of the mask specification data md shown in FIG. 4, and the selected print mode 'Mode 3' set by the print mode setting module 101 is included in the registry of the mask specification data md. In this case, the mask setting module 102 reads the 2:1 dither mask DM2 registered in relation to Mode 3 from the hard disk 11 and sets the 2:1 dither mask DM2 in the internal memory to be applied to the halftoning process in Mode 3.

When the mask specification data storage unit 203 does not have storage of the mask specification data md at step S402 or when the selected print mode is not included in the registry of the mask specification data md at step S406, the mask setting module 102 sets an originally expected dither mask corresponding to the aspect ratio of the selected print mode (step S410).

In another example, the mask specification data storage unit 203 has storage of the mask specification data md shown in FIG. 4, while the selected print mode set by the print mode setting module 101 is 'Mode 4' with a 1 to 2 aspect ratio (360 (dpi)×720 (dpi)). In this case, since the registry of the mask specification data md does not include the selected print mode 'Mode 4', the mask setting module 102 reads the originally expected 1:2 dither mask DM4 corresponding to the 1 to 2 aspect ratio of Mode 4 from the hard disk 11 and sets the 1:2 dither mask DM4 in the internal memory to be applied to the halftoning process in Mode 4.

Referring back to the print data generation process of FIG. 5, the image data input module 103 inputs image data from the application program (step S304). The resolution conversion module 104 then reads the selected print mode set by the print mode setting module 101 and converts the resolution of the input image data corresponding to the selected print mode (step S306). In the illustrated example, the resolution conversion module 104 converts the resolution of the input image data into 360 (dpi)×360 (dpi) corresponding to the selected print mode 'Mode 3'.

The color conversion module 105 performs color conversion of the resolution-converted image data (step S308). The halftoning module 106 reads the dither mask set by the mask setting module 102 and performs the halftoning process with the read dither mask to generate raster data (step S310).

In the illustrated example, the halftoning module 106 applies the 2:1 dither mask DM2 to the halftoning process to generate raster data.

The interlace data generation module 107 eventually generates resulting print data including this raster data (step S312).

The resulting print data is transferred to the printer PRT, which prints an object image according to the received print data in Mode 3 (360 (dpi)×360 (dpi)).

In the illustrated example, an object image is printed in Mode 3 (360 (dpi)×360 (dpi)) according to the print data including the raster data, which is generated by the halftoning process with the 2:1 dither mask DM2. The printed image does not have an uneven printing problem as shown in FIG. 3.

A-4. Effects of Embodiment

In a certain print mode, a positional misalignment of dots may arise to narrow the dot interval in the main scanning direction and cause the uneven printing problem. In this case, information on a different dither mask from an originally expected dither mask corresponding to the certain print mode is registered in the mask specification data md, which is stored in the mask specification data storage unit 203 of the printer PRT. The computer PC reads the mask specification data md, sets the registered dither mask different from the originally expected dither mask corresponding to the certain print mode, and applies the different dither mask to the halftoning process.

The raster data generated by the halftoning process with the 'registered dither mask different from the originally expected dither mask' specifies the wider interval of dot-on pixels in the main scanning direction than the interval of dot-on pixels in the main scanning direction specified by the raster data generated by the halftoning process with the originally expected dither mask.

The printer PRT prints an object image according to print data including the raster data generated by the halftoning process with the different dither mask. The resulting printed image accordingly has the wider dot interval in the main scanning direction and does not have an uneven printing problem.

The structure of the printer PRT in this embodiment is substantially similar to the structure of the conventional inkjet printer and is thus attained without a significant increase in manufacturing cost. The dither masks used in this embodiment are those generally used for the halftoning process in the printer. The technique of the embodiment thus desirably eliminates the potential for uneven printing due to a positional misalignment of dots without any significant total cost increase of the printing system.

B. Second Embodiment

A second embodiment of the invention adopts another known technique, the error diffusion method, to the halftoning process, while the first embodiment described above adopts the known systematic dither method to the halftoning process.

B-1. System Configuration

Figure 10:
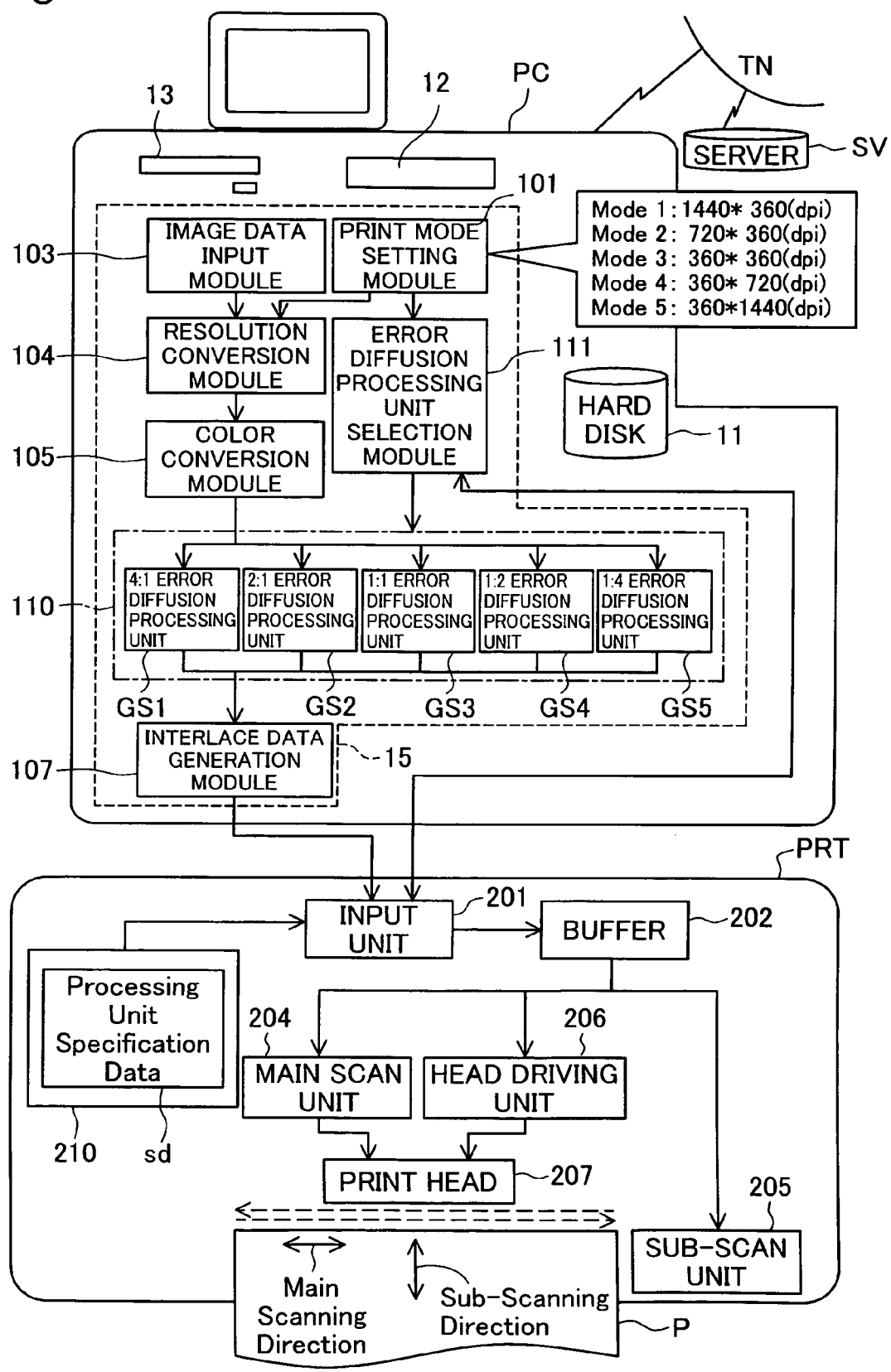
FIG. 10 schematically illustrates the configuration of a printing system in a second embodiment of the invention.

FIG. 10 schematically illustrates the configuration of a printing system in the second embodiment of the invention. The printing system of the second embodiment shown in FIG. 10 has only some differences in configuration from the printing system of the first embodiment shown in FIG. 1.

In the printing system of the second embodiment, a halftoning module 110 included in a printer driver 15 of the computer PC is different from the halftoning module 106 of the first embodiment shown in FIG. 1 and includes five error diffusion processing units corresponding to five available aspect ratios:

(1) 4:1 error diffusion processing unit GS1

(2) 2:1 error diffusion processing unit GS2

(3) 1:1 error diffusion processing unit GS3

(4) 1:2 error diffusion processing unit GS4

(5) 1:4 error diffusion processing unit GS5

Each of these five error diffusion processing units GS1 through GS5 performs the halftoning process by the known error diffusion method, based on an arrangement of error diffusion coefficients set corresponding to each aspect ratio. The halftoning module 110 activates the error diffusion processing unit selected among these five error diffusion processing units GS1 through GS5 by an error diffusion processing unit selection module 111 to perform the halftoning process and generate raster data.

The printer driver 15 of the second embodiment has the error diffusion processing unit selection module 111, in place of the mask setting module 102 included in the printer driver 10 of the first embodiment shown in FIG. 1. The error diffusion processing unit selection module 111 selects one of the five error diffusion processing units GS1 through GS5 to be used for the halftoning process, based on processing unit specification data sd (discussed later) and the print mode set by the print mode setting module 101.

In the printing system of this embodiment, dither masks are not stored in the hard disk 11, since the error diffusion method is adopted to the halftoning process.

The printer PRT of the second embodiment has a processing unit specification data storage unit 210, in place of the mask specification data storage unit 203 of the first embodiment. The processing unit specification data storage unit 210 stores the processing unit specification data sd, instead of the mask specification data md of the first embodiment.

The constituents other than those discussed above in the printing system of the second embodiment are identical with the corresponding constituents in the printing system of the first embodiment shown in FIG. 1. These like constituents are expressed by the like numerals and symbols and are not specifically described here. The corresponding modules (for example, the print mode setting module 101) have the same functions as those discussed in the first embodiment.

Figure 7:
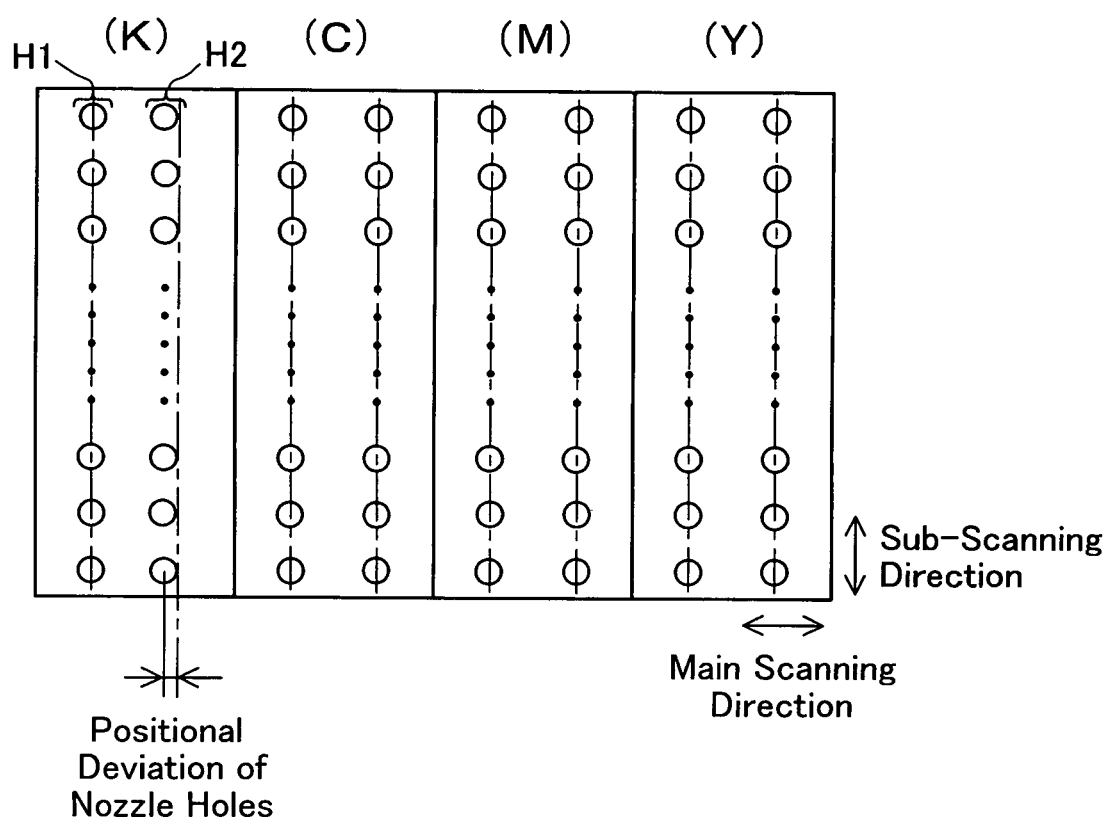
FIG. 7 shows a typical arrangement of nozzle holes on a print head.
Figure 8A:
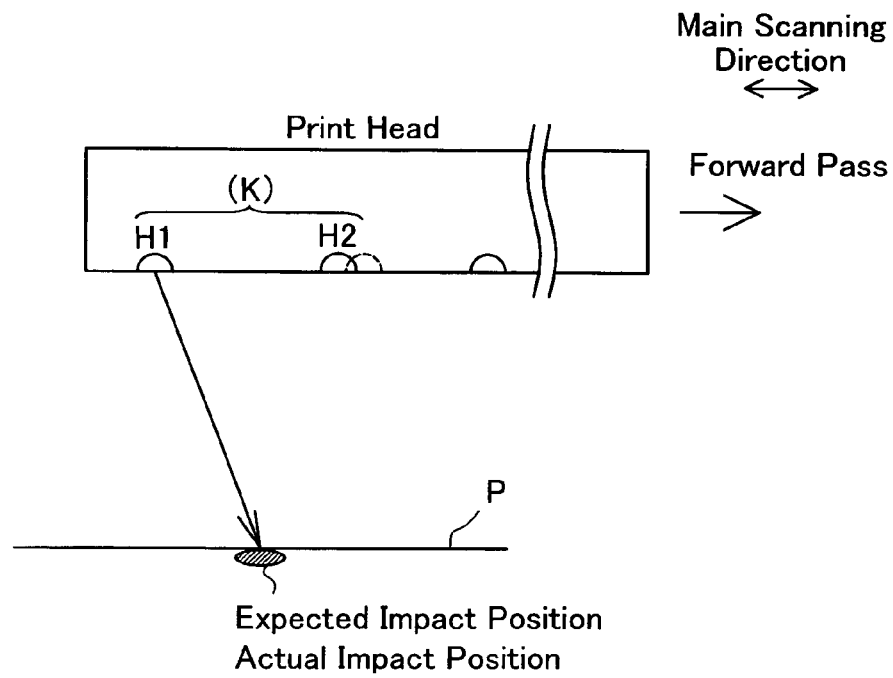
FIGS. 8(A) and 8(B) show ink droplets ejected from nozzle holes H1 and H2 of FIG. 7 to reach printing paper P.
Figure 8B:
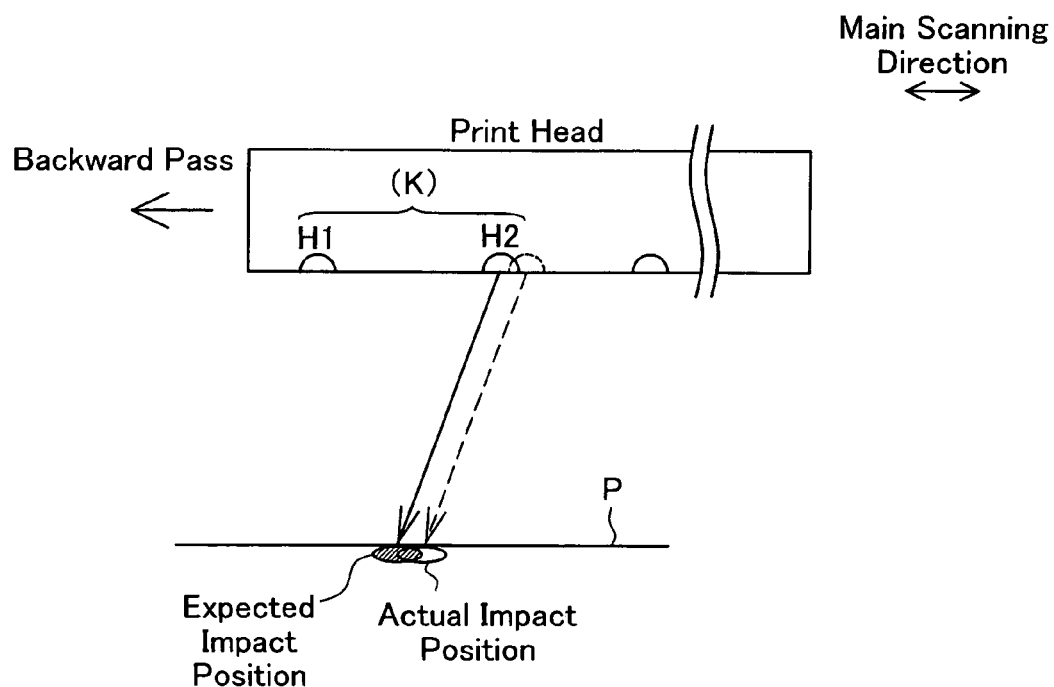

The printer PRT of this embodiment performs main scans and sub-scans in the same manner as the printer PRT of the first embodiment. The print head 207 in the printer PRT of this embodiment has the same structure as the print head 207 in the printer PRT of the first embodiment and includes nozzle holes H2 deviated from the design positions as shown in FIG. 7.

B-2. Prevention of Uneven Printing

The arrangement of error diffusion coefficients is set corresponding to each aspect ratio. The halftoning process by the error diffusion method with a preset arrangement of error diffusion coefficients corresponding to the aspect ratio of a selected print mode gives a printing result of substantially identical dot intervals in the main scanning direction and in the sub-scanning direction in the selected print mode.

For example, the selected print mode has a higher printing resolution in the main scanning direction than a printing resolution in the sub-scanning direction. In this case, the halftoning process by the error diffusion method with a preset arrangement of error diffusion coefficients corresponding to the aspect ratio of the selected print mode generates raster data specifying the wider interval of dot-on pixels in the main scanning direction than the interval of dot-on pixels in the sub-scanning direction.

The 'raster data specifying the wider interval of dot-on pixels in the main scanning direction than the interval of dot-on pixels in the sub-scanning direction' gives a printing result of the wider dot interval in the main scanning direction than the dot interval in the sub-scanning direction in another print mode having identical printing resolutions in the main scanning direction and in the sub-scanning direction.

In the event of the occurrence of uneven printing in the main scanning direction due to a positional misalignment of dots in Mode 3 (having the 1 to 1 aspect ratio) as shown in the lower drawing of FIG. 2, the 2:1 error diffusion processing unit GS2 is used to execute the halftoning process and generate raster data. A printed image according to print data including the generated raster data has a wider dot interval in the main scanning direction than a dot interval in the sub-scanning direction. This arrangement eliminates local concentration of dots and desirably prevents the occurrence of uneven printing.

B-3. Print Data Generation Process

The processing unit specification data sd is stored in the processing unit specification data storage unit 210 of the printer PRT shown in FIG. 10, prior to shipment of the printer PRT.

FIG. 11 shows the data structure of the processing unit specification data sd stored in the processing unit specification data storage unit 210. The processing unit specification data sd includes information on a print mode having a potential for uneven printing and information on a selected error diffusion processing unit to be used for elimination of the potential for uneven printing in the print mode. In the illustrated example, since the use of the 2:1 error diffusion processing unit GS2 prevents the occurrence of uneven printing in Mode 3 as described above, the processing unit specification data sd has registered information of 'Mode 3' and '2:1 error diffusion processing unit' as shown in FIG. 11.

In a similar manner to the mask specification data md of the first embodiment, the results of test printing in the inspection process before shipment of the printer PRT specify the information on the 'print mode having a potential for uneven printing' and the 'selected error diffusion processing unit to be used for elimination of the potential for uneven printing in the print mode' registered in the processing unit specification data sd. The processing unit specification data sd including the registered information is stored in the processing unit specification data storage unit 210, before shipment of the printer PRT.

A process of generating print data including raster data configured to prevent the occurrence of uneven printing is described with reference to the flowcharts of FIGS. 12 and 13.

FIG. 12 is a flowchart showing a print data generation process in the second embodiment.

As in the first embodiment, in the illustrated example, the user selects 'Mode 3 (360 (dpi)×360 (dpi))' among the five print mode options through the GUI provided by the print mode setting module 101 and sends a print command to the printer driver 10 to print an object image generated by and input from the application program with the printer PRT.

In the print data generation process, the print mode setting module 101 first sets the user's selected print mode (step S500). The processing of this step is identical with the processing of step S300 in the print data generation process of FIG. 5. The error diffusion processing unit selection module 111 then executes an error diffusion processing unit selection process (step S502). The details of this error diffusion processing unit selection process are described with reference to the flowchart of FIG. 13.

Figure 13:
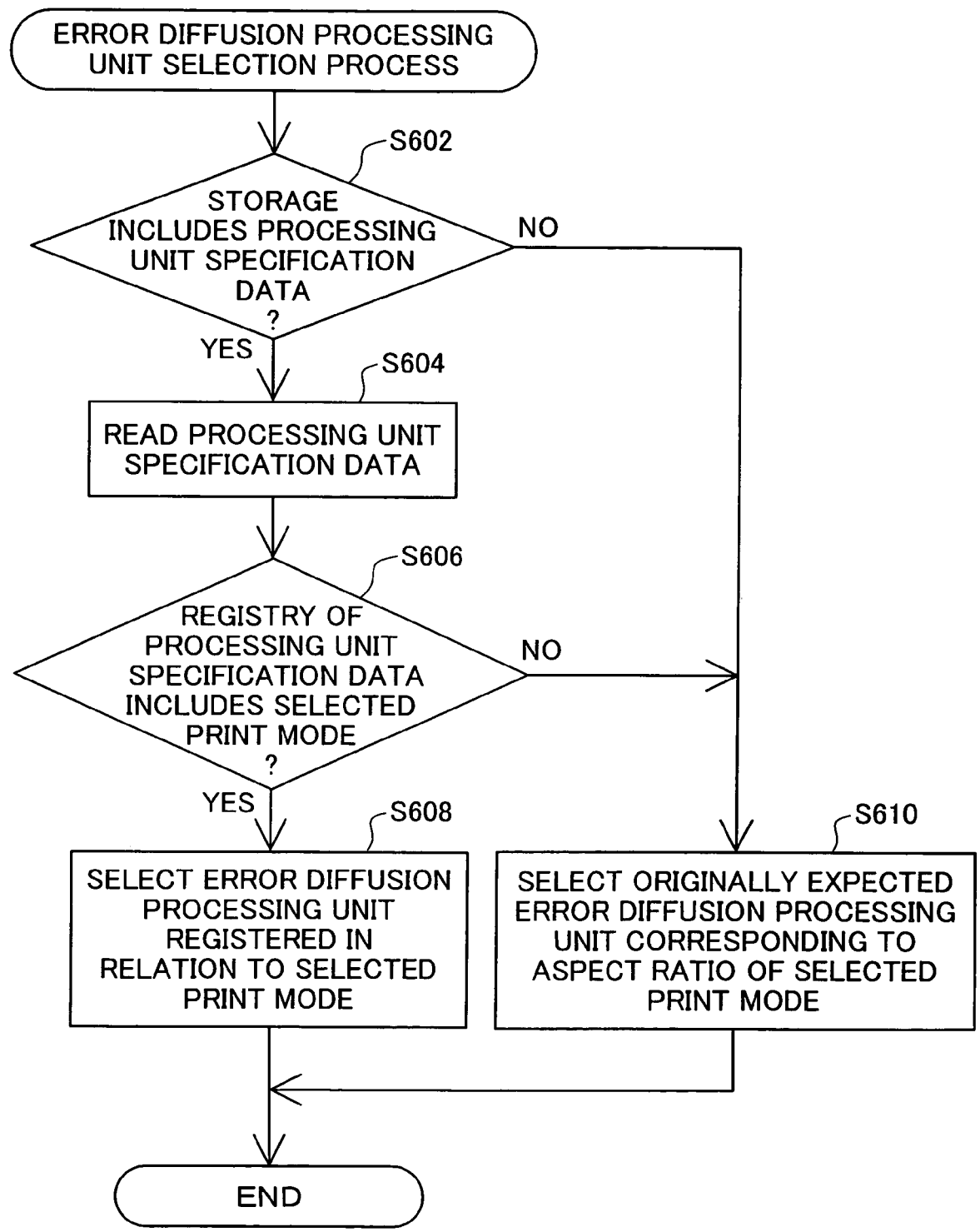
FIG. 13 is a flowchart showing the details of an error diffusion processing unit selection process in the print data generation process of FIG. 12.

FIG. 13 is a flowchart showing the details of the error diffusion processing unit selection process at step S502 executed by the error diffusion processing unit selection module 111.

The error diffusion processing unit selection module 111 determines whether the processing unit specification data storage unit 210 of the printer PRT has storage of the processing unit specification data sd (step S602) and, in response to an affirmative answer, reads the processing unit specification data sd from the processing unit specification data storage unit 210 (step S604).

The error diffusion processing unit selection module 111 reads out the print mode information representing the user's selected print mode set by the print mode setting module 101 and determines whether the selected print mode is included in the registry of the processing unit specification data sd (step S606). When the selected print mode is included in the registry, the error diffusion processing unit selection module 111 selects an error diffusion processing unit registered in relation to the selected print mode and stores the information on the selected error diffusion processing unit in the internal memory (step S608).

In one example, the processing unit specification data storage unit 210 has storage of the processing unit specification data sd shown in FIG. 11, and the selected print mode 'Mode 3' set by the print mode setting module 101 is included in the registry of the processing unit specification data sd. In this case, the error diffusion processing unit selection module 111 selects the 2:1 error diffusion processing unit GS2 registered in relation to Mode 3 and stores the information on the selected 2:1 error diffusion processing unit GS2 in the internal memory.

When the processing unit specification data storage unit 210 does not have storage of the processing unit specification data sd at step S602 or when the selected print mode is not included in the registry of the processing unit specification data sd at step S606, the error diffusion processing unit selection module 111 selects an originally expected error diffusion processing unit corresponding to the aspect ratio of the selected print mode and stores the information on the selected error diffusion processing unit in the internal memory (step S610).

Referring back to the print data generation process of FIG. 12, the processing of steps S504 through S508 is successively executed, which is identical with the processing of steps S304 to S308 in the print data generation process of FIG. 5.

The halftoning module 110 reads the information on the error diffusion processing unit selected by the error diffusion processing unit selection module 111 from the internal memory and activates the selected error diffusion processing unit to perform the halftoning process and generate raster data (step S510).

In the illustrated example, the information on the selected 2:1 error diffusion processing unit GS2 is stored in the internal memory. The halftoning module 110 thus activates the selected 2:1 error diffusion processing unit GS2 to perform the halftoning process and generate raster data.

The interlace data generation module 107 eventually generates resulting print data including this raster data (step S512).

The resulting print data is transferred to the printer PRT, which prints an object image according to the received print data in Mode 3 (360 (dpi)×360 (dpi)).

In the illustrated example, an object image is printed in Mode 3 (having the 1 to 1 aspect ratio) according to the print data including the raster data, which is generated in the halftoning process of the error diffusion method by the 2:1 error diffusion processing unit GS2. The printed image does not have an uneven printing problem in the main scanning direction.

B-4. Effects of Embodiment

In a certain print mode, a positional misalignment of dots may arise to narrow the dot interval in the main scanning direction and cause the uneven printing problem. In this case, information on a different error diffusion processing unit from an originally expected error diffusion processing unit to be used for the halftoning process in the certain print mode is registered in the processing unit specification data sd, which is stored in the processing unit specification data storage unit 210 of the printer PRT. The computer PC reads the processing unit specification data sd, selects the registered error diffusion processing unit different from the originally expected error diffusion processing unit to be used for the halftoning process in the certain print mode, and uses the selected error diffusion processing unit to perform the halftoning process.

The raster data generated in the halftoning process of the error diffusion method executed by the 'registered error diffusion processing unit different from the originally expected error diffusion processing unit' specifies the wider interval of dot-on pixels in the main scanning direction than the interval of dot-on pixels in the main scanning direction specified by the raster data generated in the halftoning process of the error diffusion method executed by the originally expected error diffusion processing unit.

The printer PRT prints an object image according to print data including the raster data generated in the halftoning process of the error diffusion method by the different error diffusion processing unit. The resulting printed image accordingly has the wider dot interval in the main scanning direction and does not have an uneven printing problem.

The structure of the printer PRT in this embodiment is substantially similar to the structure of the conventional inkjet printer and is thus attained without a significant increase in manufacturing cost. The error diffusion processing units provided in the second embodiment perform the halftoning process by the known error diffusion method and have substantially similar functions to those of the general error diffusion processing unit. The technique of the embodiment thus desirably eliminates the potential for uneven printing due to a positional misalignment of dots without any significant total cost increase of the printing system.

C. Modifications

The embodiments discussed above are to be considered in all aspects as illustrative and not restrictive. There may be many modifications, changes, and alterations without departing from the scope or spirit of the main characteristics of the present invention. Some examples of possible modification are given below.

C1. Modified Example 1

In the first and the second embodiments discussed above, a positional misalignment of dots in the main scanning direction causes an uneven printing problem in the main scanning direction. The technique of the invention is also applicable to prevent the occurrence of uneven printing in the sub-scanning direction due to a positional misalignment of dots in the sub-scanning direction.

The uneven printing problem in the sub-scanning direction may be caused by deviation of the positions of nozzle holes from their design positions in the sub-scanning direction or by deviation of the actual feed amount of printing paper from its designed feed amount, for example, due to an attachment failure of a paper feed roller.

In one example, a resulting image printed in Mode 3 with the 1 to 1 aspect ratio (360 (dpi)×360 (dpi)) has an uneven printing problem in the sub-scanning direction, which is eliminated by the wider dot interval. In this case, the halftoning process is performed with the selected 1:2 dither mask DM4 or by the selected 1:2 error diffusion processing unit GS4. The application of the 1:2 dither mask DM4 or the use of the 1:2 error diffusion processing unit GS4 gives the farther distance in the sub-scanning direction between the adjoining dots in relatively dense dot areas and thus desirably prevents the occurrence of uneven printing in the sub-scanning direction.

C2. Modified Example 2

In the first and the second embodiments discussed above, the uneven printing problem is eliminated by widening the dot interval in the main scanning direction. Some uneven printing problems may be eliminated by narrowing the dot interval in the main scanning direction and increasing the dot density over the whole image area. The technique of the invention is also applicable to eliminate the potential for such uneven printing.

Figure 14A:
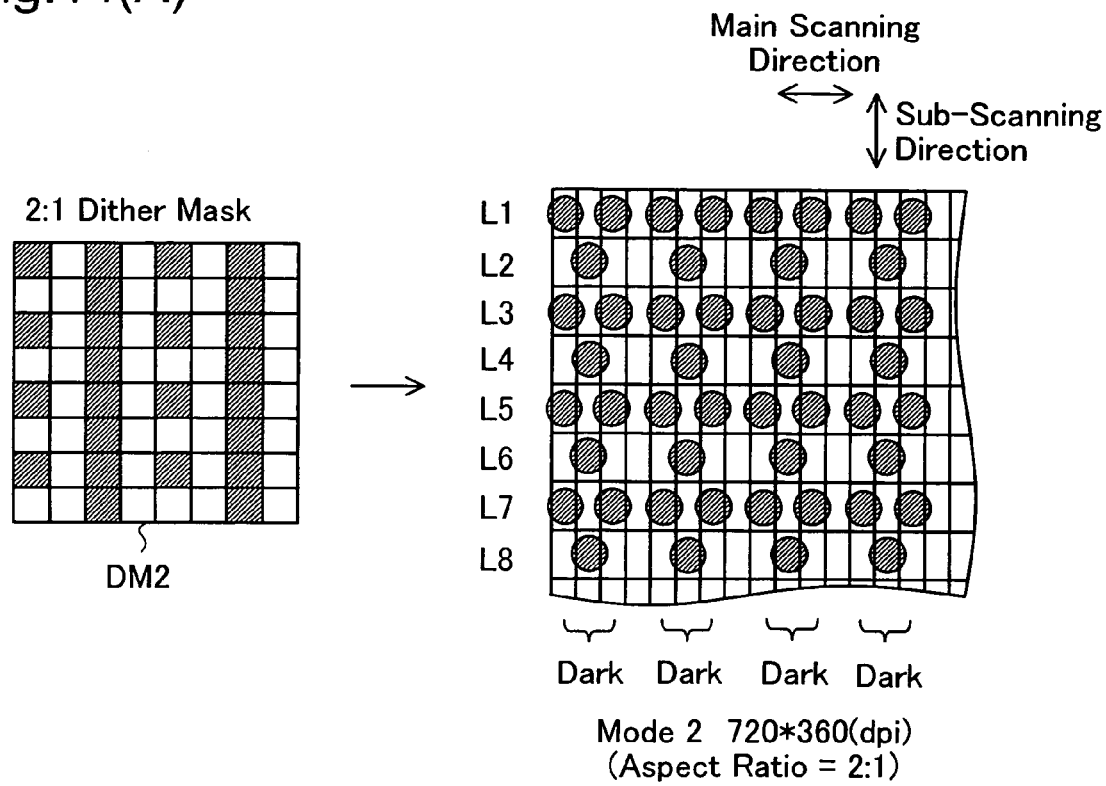
FIGS. 14(A) and 14(B) show elimination of the potential for uneven printing by narrowing the dot interval in a main scanning direction.
Figure 14B:
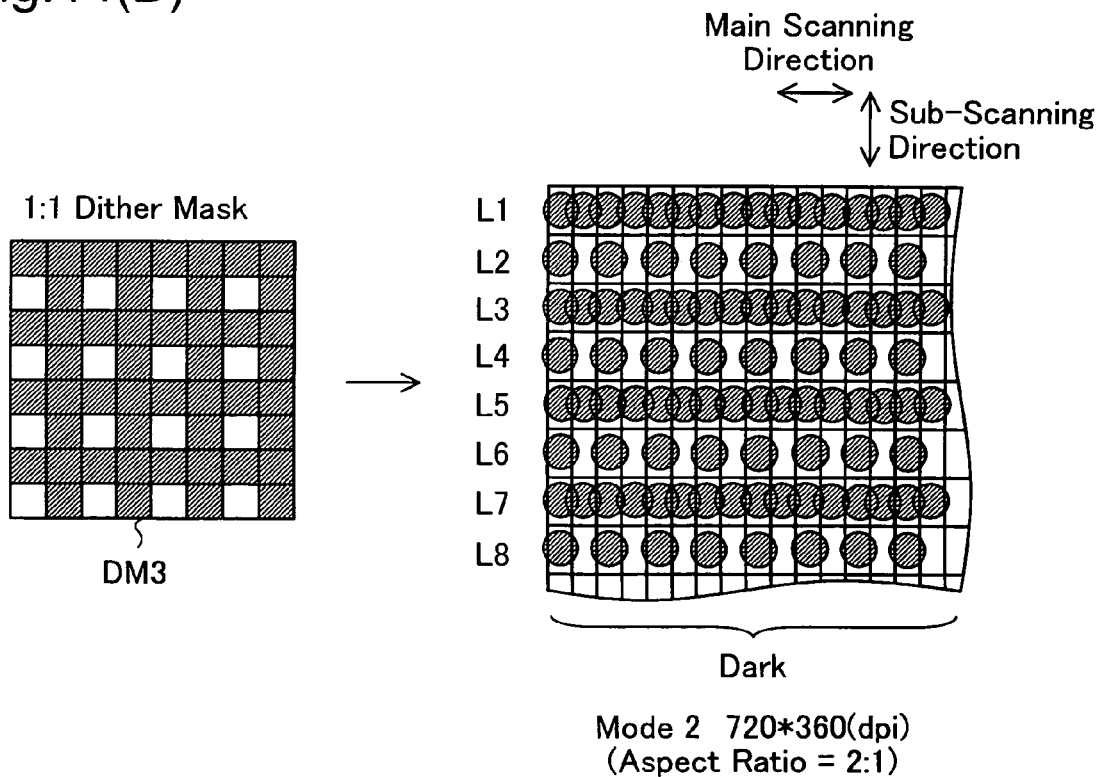

FIGS. 14(A) and 14(B) show elimination of the potential for uneven printing by narrowing the dot interval in the main scanning direction. FIG. 14(A) shows an arrangement of dots printed in Mode 2 with the 2 to 1 aspect ratio (720 (dpi)×360 (dpi)) according to print data including raster data generated by the halftoning process with the 2:1 dither mask DM2. FIG. 14(B) shows an arrangement of dots printed in Mode 2 with the 2 to 1 aspect ratio (720 (dpi)×360 (dpi)) according to print data including raster data generated by the halftoning process with the 1:1 dither mask DM3.

The left drawings of FIGS. 14(A) and 14(B) respectively show the 2:1 dither mask DM2 and the 1:1 dither mask DM3. The right drawings show the arrangements of dots printed in Mode 2 with application of the corresponding dither masks to the halftoning process of the tone data having a fixed tone value '192' in all pixels.

The numerical values of less than 192 are set in hatched cells in the 2:1 dither mask DM2 of FIG. 14(A) and in the 1:1 dither mask DM1 of FIG. 14(B).

The printer of the modified example 2 performs main scans and sub-scans in the same manner as the printers PRT of the first and the second embodiments discussed above. The print head in the printer of the modified example 2 has the same structure as the print head 207 in the printers PRT of the first and the second embodiments and includes nozzle holes H2 deviated from the design positions as shown in FIG. 7. This deviation causes a leftward shift of the positions of dots on even-numbered raster lines.

A printed result in Mode 2 with application of the 2:1 dither mask DM2 to the halftoning process has an uneven printing problem, that is, a clear distinction between relatively dense dot areas (dark areas) and relatively sparse dot areas (light areas) in the main scanning direction as shown in FIG. 14(A).

Application of the 1:1 dither mask DM3 to the halftoning process, in place of the 2:1 dither mask DM2, narrows the dot interval in the main scanning direction and increases the number of dots created per unit area. This increases the dot density over the whole image area and makes the relatively sparse dot areas visually indistinctive, thus preventing the occurrence of uneven printing, as shown in FIG. 14(B).

The above description of the modified example 2 regards the halftoning process by the systematic dither method. The technique of the modified example 2 is also applicable to the halftoning process by the error diffusion method to narrow the dot interval in the main scanning direction and increase the dot density over the whole image area for prevention of the occurrence of uneven printing. When the use of the 2:1 error diffusion processing unit GS2 for the halftoning process gives the uneven printing problem shown in FIG. 14(A), the 1:1 error diffusion processing unit GS3 is to be used for the halftoning process. Like the halftoning process by the systematic dither method, this selection increases the dot density over the whole image area and makes the relatively sparse dot areas visually indistinctive, thus preventing the occurrence of uneven printing.

The results of test printing determine which measure, either the widened dot interval or the narrowed dot interval, is to be taken for eliminating the potential of uneven printing. Based on the results of test printing, a dither mask to be applied to the halftoning process in a certain print mode and an error diffusion processing unit to be used for the halftoning process in a certain print mode are respectively registered in the mask specification data and in the processing unit specification data as described in the first and the second embodiments.

C3. Modified Example 3

The first embodiment adopts the systematic dither method to the halftoning process, but this is not essential. The halftoning process may be performed by another method using a preset parameter corresponding to the aspect ratio of each print mode, for example, the density pattern method. Like the dither mask options provided for the halftoning process of the systematic dither method, available options of the preset parameter, for example, available tone-based threshold matrix options for the halftoning process of the density pattern method, are provided corresponding to the aspect ratios of the print mode options. These available options of the preset parameter are determined to give raster data equivalent to those generated by the halftoning process with the dither mask options.

C4. Modified Example 4

The procedure of the first embodiment applies the 2:1 dither mask DM2 to prevent the occurrence of the uneven printing problem in the main scanning direction shown in FIG. 2. The 2:1 dither mask DM2 may be replaced by the 4:1 dither mask DM1. As in the case of application of the 2:1 dither mask DM2, application of the 4:1 dither mask DM1 to the halftoning process gives a printed result having the wider dot interval in the main scanning direction than the dot interval in the main scanning direction in the printed result with application of the 1:1 dither mask DM3.

Similarly the 2:1 error diffusion processing unit GS2 selected for the halftoning process in the second embodiment may be replaced by the 4:1 error diffusion processing unit GS1.

C5. Modified Example 5

In the first and the second embodiments discussed above, the printer PRT ejects ink droplets in both the forward pass and the backward pass of each main scan. The technique of the invention is also applicable to a printer that ejects ink droplets in only a single pass of each main scan.

The printer PRT creates dots on odd-numbered raster lines in forward passes of main scans, while creating dots on even-numbered raster lines in backward passes of the main scans. Each sub-scan is made at a timing of changing the direction of main scan from the forward pass to the backward pass or at a timing of changing the direction of main scan from the backward pass to the forward pass. This arrangement is, however, not essential. The technique of the invention is also applicable to a printer that creates odd-numbered dots on each raster line in a forward pass of a main scan while creating even-numbered dots on the raster line in a backward pass of the main scan. Each sub-scan is made on completion of the combination of the forward pass and the backward pass of one main scan.

C6. Modified Example 6

The first and the second embodiments discussed above regard application of the invention to the inkjet printers. The technique of the invention is applicable to not only the inkjet printers but diversity of other printing devices that perform the halftoning process by a known method, for example, the systematic dither method or the error diffusion method, and create dots on printing media to complete printed images.

C7. Modified Example 7

In the printing systems of the first and the second embodiments, part of the functions attained by the software configuration may be actualized by the hardware configuration. For example, the functions of the halftoning process may be performed by a halftoning process circuit provided as a hardware element.

What is claimed is:

1. An image processing device that generates dot data representing dot on-off state in respective pixels of an image and supplies the generated dot data to a printing device, the printing device creating multiple dots on a printing medium to print an image and being designed to print the image with at least a first ratio of a printing resolution in a main scanning direction to a printing resolution in a sub-scanning direction, the image processing device comprising:

a halftoning module that applies one specified setting of a halftoning parameter, which corresponds to the first ratio, to a halftoning process to generate dot data from image data representing the image, when the image printed with the first ratio by the printing device according to the dot data generated with the specified setting of the halftoning parameter corresponding to the first ratio has an uneven printing result, the halftoning module applying another specified setting of the halftoning parameter, which corresponds to a second ratio different from the first ratio, to the halftoning process to generate another dot data from the image data.

2. An image processing device in accordance with claim 1, wherein the halftoning parameter is either of a dither mask in systematic dither method and a threshold matrix in density pattern method.

3. An image processing device that generates dot data representing dot on-off state in respective pixels of an image and supplies the generated dot data to a printing device, the printing device creating multiple dots on a printing medium to print an image and being designed to print the image with at least a first ratio of a printing resolution in a main scanning direction to a printing resolution in a sub-scanning direction, the image processing device comprising multiple different halftoning process modules, which include at least a first halftoning process module corresponding to the first ratio and a second halftoning process module corresponding to a second ratio different from the first ratio, the image processing device activating the first halftoning process module corresponding to the first ratio to perform a halftoning process and generate dot data from image data representing the image, when the image printed with the first ratio by the printing device according to the dot data generated by the first halftoning process module has an uneven printing result, the image processing device activating the second halftoning process module corresponding to the second ratio to perform the halftoning process and generate another dot data from the image data.

4. An image processing device in accordance with claim 3, wherein each of the multiple different halftoning process modules includes an error diffusion processing unit that performs the halftoning process by error diffusion method.

5. A dot data generation method that generates dot data representing dot on-off state in respective pixels of an image and supplies the generated dot data to a printing device, the printing device creating multiple dots on a printing medium to print an image and being designed to print the image with at least a first ratio of a printing resolution in a main scanning direction to a printing-resolution in a sub-scanning direction, the dot data generation method comprising the steps of:
(a) applying one specified setting of a halftoning parameter, which corresponds to the first ratio, to a halftoning process to generate dot data from image data representing the image;
(b) when the image printed with the first ratio by the printing device according to the dot data generated in the step (a) has an uneven printing result, applying another specified setting of the halftoning parameter, which corresponds to a second ratio different from the first ratio, to the halftoning process to generate another dot data from the image data.

6. A dot data generation method that generates dot data representing dot on-off state in respective pixels of an image and supplies the generated dot data to a printing device, the printing device creating multiple dots on a printing medium to print an image and being designed to print the image with at least a first ratio of a printing resolution in a main scanning direction to a printing resolution in a sub-scanning direction, the dot data generation method comprising the steps of:
(a) activating a first halftoning process module provided corresponding to the first ratio to perform a halftoning process and generate dot data from image data representing the image; and
(b) when an image printed with the first ratio by the printing device according to the dot data generated in the step (a) has an uneven printing result, activating a second halftoning process module, which is provided corresponding to a second ratio different from the first ratio, to perform the halftoning process and generate another dot data from the image data.

* * * * *